March 8, 1960 R. WALEROWSKI 2,927,669
COMPRESSED-AIR MOTOR FOR A HOISTING GEAR
Filed Sept. 24, 1957 2 Sheets-Sheet 1
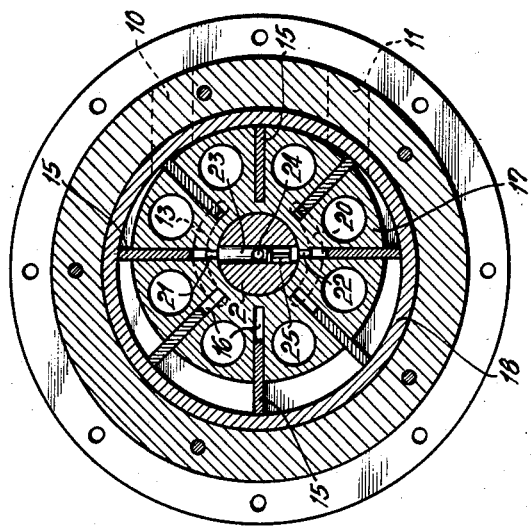
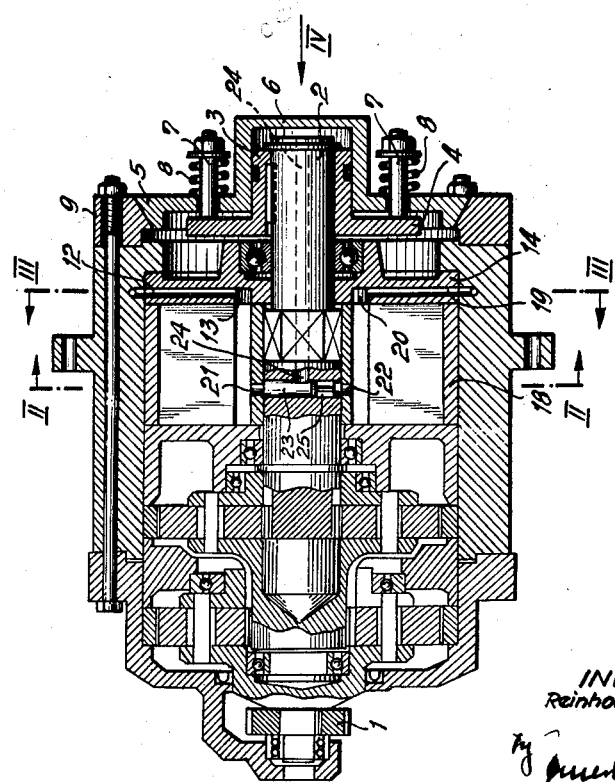
INVENTOR
Reinhold WALEROWSKI March 8, 1960   R. WALEROWSKI   2,927,669
COMPRESSED-AIR MOTOR FOR A HOISTING GEAR
Filed Sept. 24, 1957   2 Sheets-Sheet 2

INVENTOR
Reinhard WALEROWSKI

United States Patent Office
2,927,669
Patented Mar. 8, 1960

2,927,669

COMPRESSED-AIR MOTOR FOR A HOISTING GEAR

Reinhard Walerowski, Dusseldorf, Germany, assignor to Hans Putzer, Dusseldorf, Germany Application September 24, 1957, Serial No. 685,839

Claims priority, application Germany July 9, 1957

6 Claims. (Cl. 192—3)

The present invention relates to a compressed-air motor for a hoisting gear which operates in accordance with the thin plate principle and which forms a block with a reduction gear, that is a device wherein a cylinder having a plurality of inwardly projecting thin plates is included. The shifting of the direction of movement is achieved by means of a manually operated branch valve.

In the known pulley blocks driven by such a motor, a load-pressure threaded brake is provided between the motor and the winding means, which brake is rather voluminous, since the brake must be designed for a relatively high turning moment at this point. Since the brake parts are heated up upon lowering of the load due to the friction connection, a limited use of the pulley block results as additional drawback.

It is, therefore, one object of the present invention to provide a compressed-air motor which avoids the drawbacks of the known structures.

It is another object of the present to provide a compressed-air motor, wherein an air-pressure controlled braking device is provided which forms ar part of the motor block and which is disposed on the motor shaft devoloping the smallest turning moment. The braking device comprises in accordance with the present invention a brake-disc, which in a central arrangement includes a pressure cylinder, the piston of which comprises the end of the motor-shaft with a collar bushing secured thereto. The pressurized air is fed from the two feeding openings of the motor for the pressurized air through properly arranged channels and passing the hollow motor shaft into the brake disc pressure cylinder. The brake-disc, which is formed at its periphery like a cone, slides in a hollow cone which is connected as a ring with the motor housing. By means of spring bolts which are connected with the collar of the collar-bushing and which project through the wall of the brake-disc, the friction moment caused by the pressure springs of the bolts is transferred to the motor-shaft.

With these and other objects in view which will become apparent in the following detailed description, the present invention will be clearly understood in connection with the accompanying drawings, in which:

Figure 1 is a front elevation of the motor partly in section with the braking device;

Fig. 2 is a cross-section along the lines 2—2 of Fig. 1;

Figure 3:
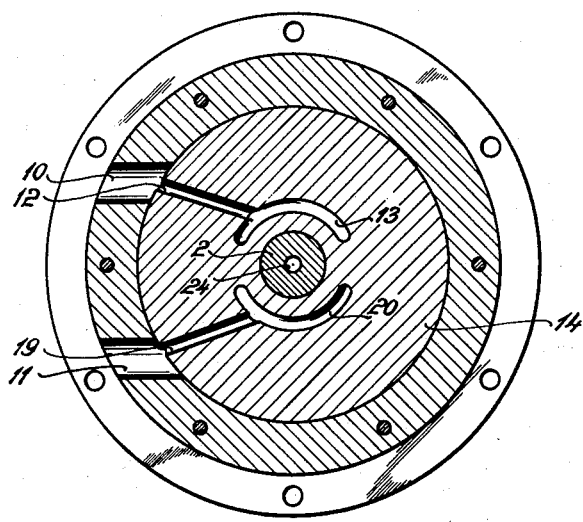
Fig. 3 is a section along the lines 3—3 of Fig. 1.
Figure 4:
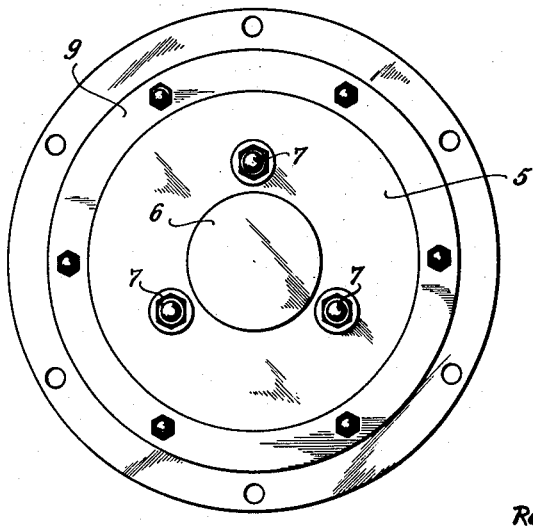
Fig. 4 is an end view of the motor.

Referring now to the drawings, the motor is disposed in a housing and includes any conventional reduction gear and is disposed on the left side of Fig. 1 in the full view portion of said portion. The reduction gear is designed to reduce the number of revolutions for the pinion 1 driven by said motor. The extended motorshaft 2 has secured thereto a bushing 3 having a collar 4, which bushing 3 cannot move axially or radially. The brake-disc 5 with its pressure cylinder 6 is axially movable and guided by the spring bolts 7. The outer cone of the brake-disc 5 is pressed by means of the pressure springs 8 towards the cone-ring 9. The feeding openings 10 and 11 for the pressure air of the motor, which are controlled by a branch-valve (not shown), are provided, whereby the feeding of pressure air into any one of said feeding openings causes releasing of the brake disc 5. The pressure air is fed from the opening 10 through the channel 12 into an arcuate-shaped recess 13 of the motor-bearing disc 14 below the thin air vanes 15, which while guided in slots 16 of the rotor 17 are moved by the air pressure in the arcuate-shaped recess 13 against the bore of the cylinder 18 of the motor housing. On the other hand the pressure air is fed from the opening 11 through the channel 19, for the same purpose as before, into the arcuate-shaped recess 20 of the motor bearing disc 14. The pressure air reaches from the recesses 13 or 20, respectively, in accordance with the present invention, through the bores 21 or 22 into the cross-bore 23 of the shaft 2 and from there through the longitudinal bore 24 into the pressure cylinder 6 of the brake-disc 5. A piston 25 is disposed in the cross-bore 23 which assumes the position shown in Figs. 1 and 2 of the drawings when the pressure air enters through the opening 10, while upon the entering the pressure air through the opening 11, the piston 25 is moved to the other end of the bore 23.

Thus, in accordance with the present invention, the motor and the brake are built together and form a single block. The motor is equipped with the oppositely disposed bores 21 and 22 of the rotor 17 and the cross-bore 23 and the axial bore 24 of the motor-shaft 2. A piston 25 is disposed for reciprocating movement in the cross-bore 23. This arrangement permits of lifting of the brake by the pressure medium in the following manner: In order to change the direction of the rotation for the motor, the pressure medium is fed to the motor either through the feeding opening 10 into the channel 12 to the recess 13 or through the feeding opening 11 into the channel 19 to the recess 20. In the first case, that is, if the pressure medium is fed through the feeding opening 10, the pressure medium pushes the plates 15, which are within the range of the kidney-shaped recess 13, towards the bore of the pressure cylinder 18 of the motor, so that the motor can start. During the outward movement of the plates 15 towards the bore of the pressure cylinder 18, a pressure chamber is created within the guide slots for the plates below the latter. This air pressure arrangement is known in this type of motors.

In accordance with the present invention, however, the bore 21 is provided in the rotor 17, so that said pressure chamber communicates with the cross-bore 23 and in turn with the axial bore 24, thus feeding the pressurized air into the pressure cylinder 6, whereby the piston 25, reciprocating in the cross-bore 23, seals off the oppositely disposed bore 22. Due to the pressure prevailing now in the brake cylinder 6, the brake-disc 5, integrally formed with the brake cylinder 6, is released from the hollow cone-ring 9 secured to the motor-housing against the force of the springs 8, thus releasing the brake. As long as the pressure medium is fed to the motor, the brake remains in its released position and is closed again if the feeding of the air ceases voluntarily or involuntarily.

If the pressure medium is fed through the feeding opening 11 into the channel 19 to the recess 20, and then through the bore 22 into the shaft 2, pushing the piston 25 to the bore 21 which leads into the cross-bore 23, the pressure medium feeds again through the bore 23 and 24 into the pressure cylinder 6, bringing about again the releasing of the brake as before.

It is quite clear, that instead of providing a conical brake-disc, as disclosed in the drawings, any other axially operating brake strutcure may be used, particularly since the brake cylinder is the main feature of the present invention, while the other brake parts may be of conventional nature.

While I have disclosed one embodiment of the present invention, it is to be understood that this embodiment is given by example only and not in a limiting sense, the scope of the present invention being determined by the obects and the claims.

I claim:

1. In combination with a reversible air motor including a shaft and having a source of compressed air, said motor comprising a housing and a rotor secured to said shaft, said rotor being eccentrically positioned relative to said housing, and said rotor having a plurality of radially disposed guide slots and a plurality of plates moving radially in said guide slots, said housing having a feeding opening and said rotor having a channel communicating with said feeding opening and defining an arcuate-shaped chamber adapted to receive said compressed air through said feeding opening and said channel, said shaft having an open-ended, crosswise disposed bore communicating with said chamber, a piston reciprocably slidable in said bore so as to effect selective opening and closing of the ends of said crosswise disposed bore, said shaft having an axial bore communicating with said crosswise disposed bore and terminating at one of its ends at the end of said shaft, and brake means including a pressure cylinder axially movable from a braking position into a released position and communicating with said one of the ends of said axial bore, said pressure cylinder being adapted to receive said compressed air fed to said rotor to move said brake means into released position.

2. The compressed-air motor, as set forth in claim 1, wherein said brake means comprises a braking disc disposed at said end of said shaft and said braking disc defines said pressure cylinder receiving pressurized air.

3. The compressed-air motor, as set forth in claim 2, wherein said braking disc is formed as a planar disc.

4. The compressed-air motor, as set forth in claim 2, which includes a conical ring connected with said housing, and said braking disc is of conical shape at its periphery and operatively received by said conical ring, so that upon engagement between said conical ring and said braking disc a braking action is obtained.

5. The compressed-air motor, as set forth in claim 2, which includes a collar bushing surrounding one end of said shaft and disposed in said pressure cylinder to function as a piston therein.

6. The compressed-air motor as set forth in claim 5, which includes a plurality of screw bolts projecting axially from said collar bushing through said braking disc, thereby, transferring the braking action to said shaft.

References Cited in the file of this patent

UNITED STATES PATENTS

| | | |
|---|---|---|
| 2,743,708 | Lungerhausen | May 1, 1956 |
| 2,823,775 | Zwayer | Feb. 18, 1958 |